UNITED STATES PATENT OFFICE.

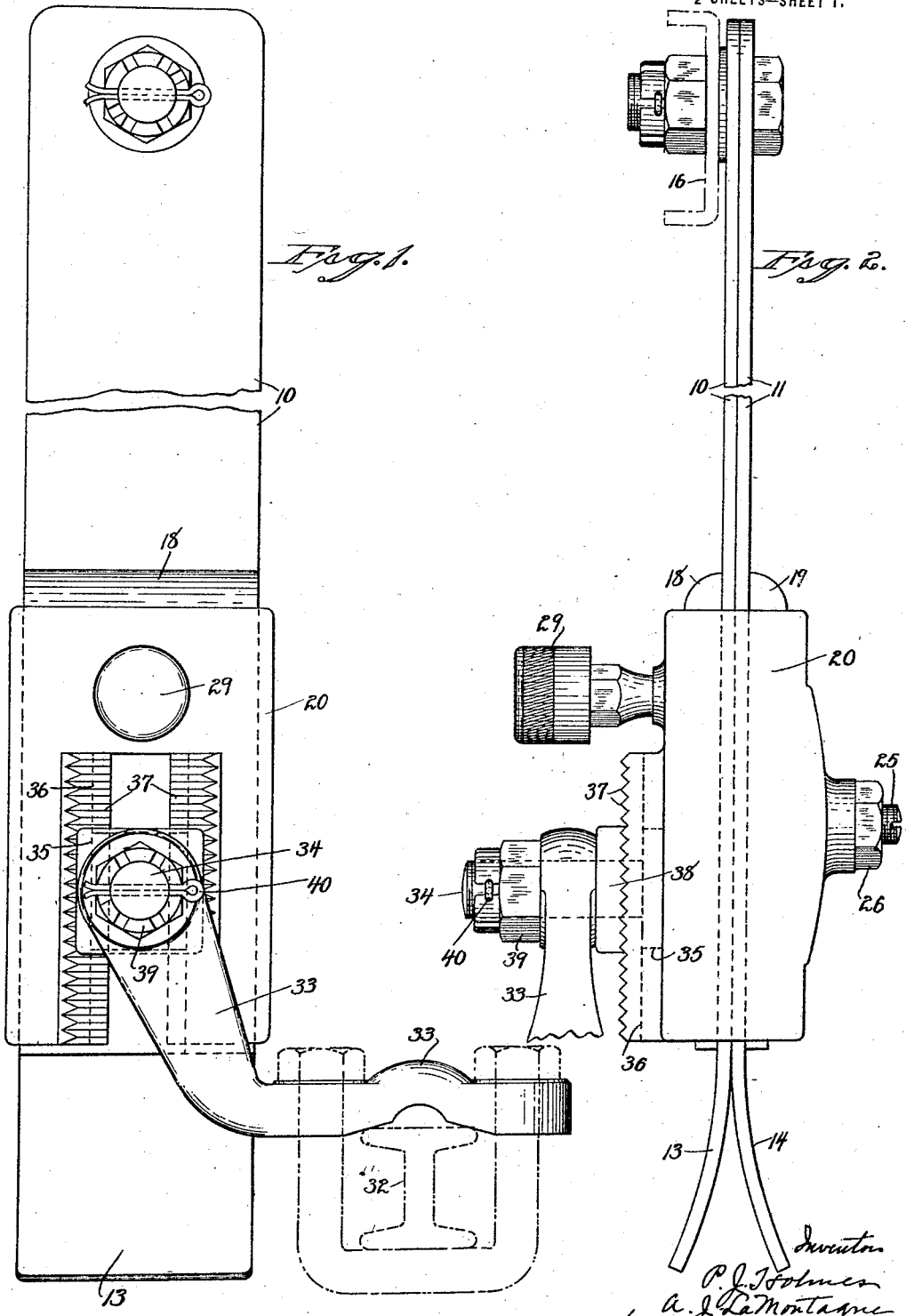

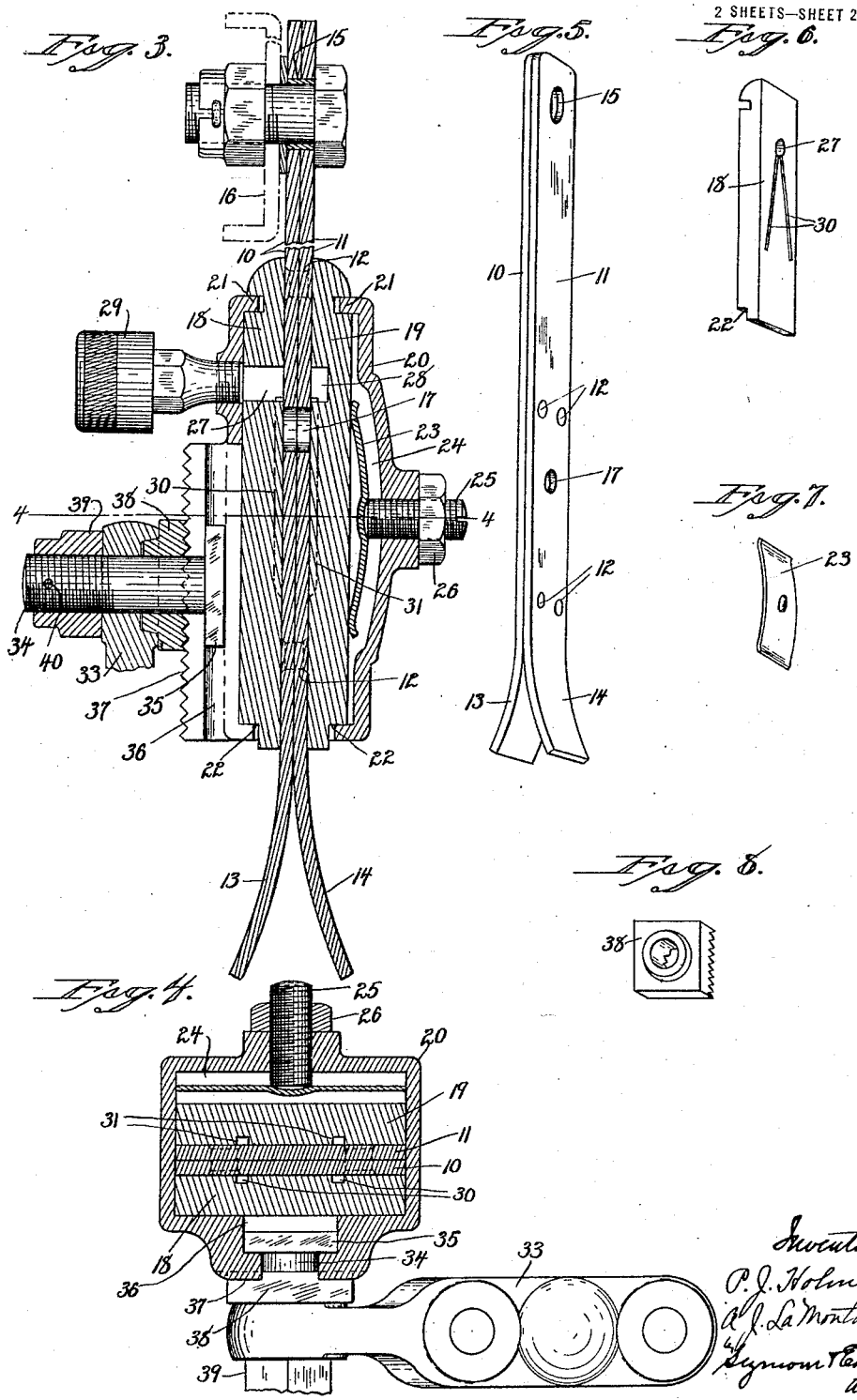

PERCY J. HOLMES AND ARTHUR J. LA MONTAGNE, OF NEW HAVEN, CONNECTICUT, ASSIGNORS TO THE HOLMES SPECIAL TOOL CO., OF NEW HAVEN, CONNECTICUT, A CORPORATION.

SHOCK ABSORBER.

1,410,253.      Specification of Letters Patent.      Patented Mar. 21, 1922.

Application filed November 2, 1920. Serial No. 421,379.

*To all whom it may concern:*

Be it known that we, PERCY J. HOLMES and ARTHUR J. LA MONTAGNE, citizens of the United States, residing at New Haven, in the county of New Haven and State of Connecticut, have invented a new and useful Improvement in Shock Absorbers; and we do hereby declare the following, when taken in connection with the accompanying drawings and the characters of reference marked thereon, to be a full, clear, and exact description of the same, and which said drawings constitute part of this application, and represent, in—

Fig. 1, a front view of a shock absorber constructed in accordance with our invention.

Fig. 2, a side view of the same with the connecting arm broken away.

Fig. 3, a vertical sectional view of the same.

Fig. 4, a sectional view on the line 4—4 of Fig. 3.

Fig. 5, a perspective view of the slide detached.

Fig. 6, a perspective view of one of the blocks detached.

Fig. 7, a perspective view of the friction spring detached.

Fig. 8, a perspective view of the locking block detached.

This invention relates to an improvement in shock absorbers or stabilizers for motor vehicles, and particularly to that type which includes a slide passing between two friction plates.

The object of this invention is to employ two plates so arranged that the friction may be adjusted; to provide means for applying lubrication to the plates, and to provide means whereby the device may be adjusted to various types of cars, and the invention consists in the construction and arrangement of parts as hereinafter described and particularly recited in the claims.

In carrying out our invention we employ two plates 10 and 11 formed from strips of metal and secured together by rivets 12 between their ends, the lower ends 13 and 14 being curved away from each other and the upper ends being formed with a hole 15 through which the plates may be bolted to a vehicle frame 16. These plates are also formed with a transverse hole 17 for the purposes as will hereinafter appear. These plates are arranged between wood friction blocks 18 and 19, which are located in a housing 20, having integral front, back and side walls, the outer faces of the upper ends of the blocks being notched to receive the edges 21 of the housing and formed at the lower ends with shoulders 22 to rest upon the lower edges of the housing. These blocks may be crowded against the plates by means of a bowed spring 23, bearing against the outer face of the block 19 and seated in a chamber 24 of the housing, and adapted to be compressed by a set-screw 25, which, when adjusted, may be locked by a nut 26. Extending through the block 18 is a grease passage 27 registering with a notch 28 in the inner face of the block 19, and mounted in the casing in line with the passage 27 is a grease cup 29 of usual construction, and communicating with the passage 27 and notch 28 are grease channels 30 and 31 in the inner faces of the blocks 18 and 19, and so that when the hole 17 in the plates registers with the hole 27 in the block, grease may pass through the plates into the notch 28 and thence downward through the channels 31. The housing is adapted to be connected with the axle 32, by means of an arm 33 mounted upon a stud 34 which is formed with a head 35 riding in under cut guideways 36 formed in one of the outer faces of the housing, the outer faces of guideways are formed with teeth or serrations 37 to be engaged by a correspondingly serrated locking block 38 also mounted on the stud 34, and with which the arm 33 is held in frictional engagement by means of a nut 39 which may be held against turning by a cotter pin 40. When connected with the frame and axle of a car the required tension is placed upon the spring 23 and the arm adjusted with relation to the housing to allow the parts to move in proper relation to the movement of the body of the car, and so as to absorb shock or stabilize the movement of the vehicle frame, and the spring may be adjusted as may be required to take up wear upon the faces of the friction blocks which, by means of the grease cup, however, will be properly lubricated.

We claim:

1. A shock absorber comprising two plates reversely-bowed outward at their lower ends, a one-piece housing through which the plates extend, two friction blocks mounted in said housing, one on the outside of each plate, a bowed spring within the housing and bearing on one of said blocks, and means for connecting the housing with a vehicle axle.

2. A shock absorber comprising two plates riveted together between their ends, and the lower ends diverged, a housing through which said plates pass, friction blocks mounted in said housing on opposite sides of said plates, one of said blocks formed with a hole and the other with a notch in line therewith and the plates formed with an opening adapted to register with said hole and notch, the inner faces of said plates also formed with channels, a grease cup mounted in the casing in line with the hole in the friction block, and means for connecting the housing with a vehicle axle.

3. A shock absorber comprising two plates riveted together, a housing through which said plates extend, friction blocks mounted in said housing on opposite sides of said plates, said housing formed on one of its outer walls with vertical under-cut guideways, a stud mounted for movement in said guideways, a locking block on said stud engaging with said guideways, and an arm adapted to be coupled with a vehicle axle and with said locking block.

In testimony whereof, we have signed this specification in the presence of two subscribing witnesses.

PERCY J. HOLMES.
ARTHUR J. LA MONTAGNE.

Witnesses:
FREDERIC C. EARLE,
GRACE A. FOOTE.